United States Patent
Zhen et al.

(10) Patent No.: US 12,373,573 B2
(45) Date of Patent: Jul. 29, 2025

(54) VULNERABILITY PROCESSING METHOD, APPARATUS AND DEVICE, AND COMPUTER-READABLE STORAGE MEDIUM

(71) Applicant: SHANDONG YINGXIN COMPUTER TECHNOLOGIES CO., LTD., Shandong (CN)

(72) Inventors: Peng Zhen, Shandong (CN); Yuan Liang, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 247 days.

(21) Appl. No.: 18/041,725

(22) PCT Filed: Jun. 30, 2021

(86) PCT No.: PCT/CN2021/103344
§ 371 (c)(1),
(2) Date: Feb. 15, 2023

(87) PCT Pub. No.: WO2022/042010
PCT Pub. Date: Mar. 3, 2022

(65) Prior Publication Data
US 2023/0315864 A1 Oct. 5, 2023

(30) Foreign Application Priority Data
Aug. 27, 2020 (CN) .......................... 202010878533.5

(51) Int. Cl.
*G06F 21/57* (2013.01)
*G06F 21/52* (2013.01)

(52) U.S. Cl.
CPC ...... *G06F 21/577* (2013.01); *G06F 2221/033* (2013.01)

(58) Field of Classification Search
CPC .......... G06F 21/50; G06F 21/52; G06F 21/57; G06F 21/577; G06F 2221/033
See application file for complete search history.

(56) References Cited

U.S. PATENT DOCUMENTS

| 9,692,778 B1 | 6/2017 | Mohanty |
| 10,579,803 B1 * | 3/2020 | Mueller ................ G06F 21/577 |

(Continued)

FOREIGN PATENT DOCUMENTS

| CN | 101526984 A | 9/2009 |
| CN | 103258165 A | 8/2013 |

(Continued)

OTHER PUBLICATIONS

International search report for PCT/CN2021/103344 mailed on Sep. 23, 2021.
Chinese search report for 202010878533.5 filed on Aug. 27, 2020.

*Primary Examiner* — Shewaye Gelagay
*Assistant Examiner* — Ayub A Maye
(74) *Attorney, Agent, or Firm* — Dennemeyer & Associates LLC (57) ABSTRACT

A vulnerability processing method, apparatus and device, and a computer-readable storage medium. The method includes: a trust evaluation of preset evaluation items on a detected vulnerability is performed, and a trust level corresponding to the vulnerability is obtained, and the vulnerability is processed according to the trust level and a preset vulnerability trust list. In the present disclosure, through performing the trust evaluation of preset evaluation items on a detected vulnerability and obtaining the trust level corresponding to the vulnerability and setting the preset vulnerability trust list, vulnerabilities that do not need to be repaired in detected vulnerabilities can be preliminarily screened, and in combination with an impact of the vulnerabilities on an actual service of a user, the user is assisted in (Continued)

quickly identifying a key vulnerability that needs to be repaired, thereby improving usability and efficiency, and reducing costs of manual analysis of vulnerabilities.

19 Claims, 2 Drawing Sheets

(56) References Cited

U.S. PATENT DOCUMENTS

| | | |
|---|---|---|
| 2004/0221176 A1 | 11/2004 | Cole |
| 2019/0180003 A1* | 6/2019 | Schultz ............... G06F 16/1748 |
| 2020/0167476 A1* | 5/2020 | Boulton ................ G06F 21/563 |
| 2021/0056209 A1* | 2/2021 | Fox ....................... G06F 21/563 |
| 2021/0397717 A1* | 12/2021 | Shwartz ............. G06Q 10/0635 |

FOREIGN PATENT DOCUMENTS

| | | | |
|---|---|---|---|
| CN | 104321780 A | | 1/2015 |
| CN | 104618178 A | * | 5/2015 |
| CN | 106611126 A | | 5/2017 |
| CN | 107766731 A | | 3/2018 |
| CN | 108667812 A | | 10/2018 |
| CN | 109617910 A | | 4/2019 |
| CN | 111338692 A | | 6/2020 |
| CN | 111428248 A | | 7/2020 |
| CN | 111967021 A | | 11/2020 |

\* cited by examiner

Fig. 3

VULNERABILITY PROCESSING METHOD, APPARATUS AND DEVICE, AND COMPUTER-READABLE STORAGE MEDIUM

CROSS-REFERENCE TO RELATED APPLICATIONS

This is a 35 U.S.C. 371 National Stage of International Application No. PCT/CN2021/103344, filed Jun. 30, 2021, which claims priority to Chinese application 202010878533.5, filed Aug. 27, 2020, in China National Intellectual Property Administration, which is incorporated herein by reference in its entirety.

TECHNICAL FIELD

The present disclosure relates to the field of computers, and particularly relates to a vulnerability processing method, apparatus and device, and a computer-readable storage medium.

BACKGROUND

In an evolving safety defense mechanism, risk detection and early warning are increasingly valued, and vulnerability detection is an important part. While in the actual vulnerability detection, a service system will easily have thousands of vulnerabilities detected.

In the prior art, when a detected vulnerability is processed, a vulnerability hazard level is often prompted to a user via a vulnerability prompt, so the user can choose to repair the vulnerability or ignore the vulnerability according to requirements. However, due to multiple vulnerabilities, the user will receive numerous vulnerability prompts according to the existing vulnerability processing method, which makes it difficult for the user to quickly identify key vulnerabilities that need to be repaired, resulting in a high cost of manual analysis of vulnerabilities.

Therefore, how to make users to quickly identify key vulnerabilities that need to be repaired, improve the usability and efficiency, and reduce the costs of manual analysis of vulnerabilities is an urgent problem to be solved today.

SUMMARY

The objective of the present disclosure is to provide a vulnerability processing method, apparatus and device, and a computer-readable storage medium, to make users to quickly identify key vulnerabilities that need to be repaired, improve the usability and efficiency, and reduce the costs of manual analysis of vulnerabilities.

In order to solve the above technical problem, the present disclosure provides a vulnerability processing method, including:
 a trust evaluation of preset evaluation items on a detected vulnerability is performed, and a trust level corresponding to the vulnerability is obtained, wherein the preset evaluation items include a vulnerability hazard level evaluation item and a service impact evaluation item; and the vulnerability according to the trust level and a preset vulnerability trust list is processed.

In some embodiments, the vulnerability according to the trust level and the preset vulnerability trust list is processed includes:
 the preset vulnerability trust list corresponding to the vulnerability is obtained;
 it is determined that whether the vulnerability is a user trust vulnerability according to the preset vulnerability trust list and when the vulnerability is not the user trust vulnerability, vulnerability prompting information corresponding to the vulnerability to a target device is generated and sent; wherein the vulnerability prompting information includes the trust level.

In some embodiments, before the preset vulnerability trust list corresponding to the vulnerability is obtained, the method further includes: whether the trust level reaches a preset safety level is determined; and
 when the trust level does not reach the preset safety level, the step of obtaining the preset vulnerability trust list corresponding to the vulnerability is executed.

In some embodiments, after the vulnerability prompting information corresponding to the vulnerability to a target device is generated and sent, the method further includes:
 resolve information corresponding to the vulnerability prompting information is obtained; and
 when the resolve information is trust information, the vulnerability as the user trust vulnerability is taken, and trust list information corresponding to the vulnerability to the preset vulnerability trust list is added; wherein the trust list information includes a vulnerability identity (ID), a vulnerability name and a trust level of the vulnerability; or
 when the resolve information is repair information, the vulnerability is repaired.

In some embodiments, the method further includes:
 a target trust level corresponding to a target vulnerability according to the preset vulnerability trust list is detected; wherein the target vulnerability is any one of user trust vulnerabilities corresponding to the preset vulnerability trust list, and the target trust level is a reduced trust level corresponding to the target vulnerability; and
 trust change information corresponding to the target vulnerability is generated; wherein the trust change information includes the target trust level.

In some embodiments, the trust evaluation of preset evaluation items on the detected vulnerability is performed, and the trust level corresponding to the vulnerability is obtained includes:
 a vulnerability hazard level of the vulnerability is evaluated, and a hazard level score corresponding to the vulnerability is obtained; wherein a higher level of the vulnerability hazard level corresponds to a lower score of the hazard level score;
 an impact of repairing the vulnerability on the system is evaluated, and a system impact score corresponding to the vulnerability is obtained; wherein the system impact score is a preset system restart score, a preset system non-restart score, a preset service restart score or a preset service non-restart score, the preset system restart score is less than the preset system non-restart score, the preset service restart score is less than the preset service non-restart score, and the preset system restart score is less than the preset service restart score;
 whether software corresponding to the vulnerability is software in a white list is evaluated, and a software safety score corresponding to the vulnerability is obtained; wherein the software safety score is a preset white-list software score or a preset non-white-list software score, and the preset white-list software score is greater than the preset non-white-list software score;
 whether the software corresponding to the vulnerability is in a starting state is evaluated, and a software state score corresponding to the vulnerability is obtained; wherein the software state score is a preset software starting score or a preset software non-starting score, and the preset software non-starting score is greater than the preset software starting score; and the trust level is determined according to the hazard level score, the system impact score, the software safety score, and the software state score.

In some embodiments, the trust level is determined according to the hazard level score, the system impact score, the software safety score, and the software state score includes:

a sum of a first score, a second score, a third score and a fourth score to obtain the trust level is computed; wherein the first score is a product of the hazard level score and a first priority ratio, the second score is a product of the system impact score and a second priority ratio, the third score is a product of the software safety score and a third priority ratio, the fourth score is a product of the software state score and a fourth priority ratio, the first priority ratio is greater than the second priority ratio, the second priority ratio is greater than the third priority ratio, and the third priority ratio is greater than the fourth priority ratio.

The present disclosure further provides a second aspect of the present disclosure provides a vulnerability processing apparatus, including:

a trust evaluation module is configured to perform a trust evaluation of preset evaluation items on a detected vulnerability, and obtain a trust level corresponding to the vulnerability, where the preset evaluation items include a vulnerability hazard level evaluation item and a service impact evaluation item; and a processing module is configured to process the vulnerability according to the trust level and a preset vulnerability trust list.

The present disclosure further provides a vulnerability processing device, including:

a memory is configured to store a computer program; and a processor is configured to implement the steps of the above vulnerability processing method when executing the computer program.

Moreover, the present disclosure further provides a computer-readable storage medium, storing a computer program, where the computer program implements steps of the above vulnerability processing method when executed by a processor.

The vulnerability processing method provided in the present disclosure includes: the trust evaluation of preset evaluation items on the detected vulnerability is performed, and the trust level corresponding to the vulnerability is obtained, wherein the preset evaluation items includes the vulnerability hazard level evaluation item and the service impact evaluation item; and the vulnerability according to the trust level and the preset vulnerability trust list is processed.

It can be seen that in the present disclosure, through performing the trust evaluation of preset evaluation items on the detected vulnerability and obtaining the trust level corresponding to the vulnerability and setting a preset vulnerability trust list, vulnerabilities that do not need to be repaired in detected vulnerabilities may be preliminarily screened, and in combination with an impact of the vulnerabilities on an actual service of a user, the user is assisted in quickly identifying a key vulnerability that needs to be repaired, thereby improving usability and efficiency, and reducing costs of manual analysis of vulnerabilities. Moreover, the present disclosure further provides the vulnerability processing apparatus and device, and the computer-readable storage medium that have the same benefits as described above.

BRIEF DESCRIPTION OF THE DRAWINGS

In order to more clearly illustrate embodiment in the embodiments of the present disclosure or in the prior art, a brief introduction to the accompanying drawings required for the description of the embodiments or the prior art will be provided below. Obviously, the accompanying drawings in the following description are only some of the embodiments of the present disclosure, and those ordinary skill in the art would also be able to derive other drawings from these drawings without making creative efforts.

DETAILED DESCRIPTION OF THE EMBODIMENTS

For making the objectives, method and advantages of embodiments of the present disclosure more obvious, the embodiment of the present disclosure will be clearly and completely described below in conjunction with the accompanying drawings in the embodiments of the present disclosure, and obviously, the described embodiments are some, rather than all of the embodiments of the present disclosure. Based on the embodiments of the present disclosure, all other embodiments acquired through those of ordinary skill in the art without making creative efforts fall within the scope of protection of the present disclosure.

Figure 1:
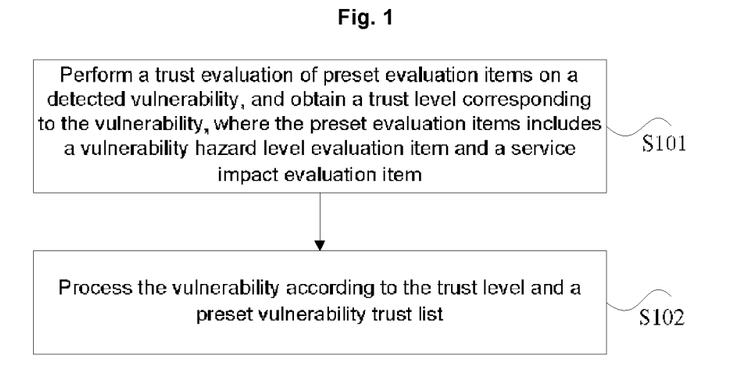
FIG. 1 is a flowchart of a vulnerability processing method provided in an embodiment of the present disclosure.

With reference FIG. 1, FIG. 1 is a flowchart of a vulnerability processing method provided in an embodiment of the present disclosure. The method may include:

At step S101: a trust evaluation of preset evaluation items on a detected vulnerability is performed, and a trust level corresponding to the vulnerability is obtained, wherein the preset evaluation items includes a vulnerability hazard level evaluation item and a service impact evaluation item It can be understood that the preset evaluation items in the step S101 may be items that need to be evaluated when a processor performs trust evaluation on the detected vulnerability. The specific number and type of the preset evaluation items in the step may be set through a designer according to a practical scene and a user requirement, in an embodiment, the preset evaluation items may include a vulnerability hazard level evaluation item, that is, when the processor performs the trust evaluation on the detected vulnerability, the vulnerability hazard level of the vulnerability may be evaluated. The preset evaluation items may further include a service impact evaluation item, that is, when the processor performs the trust evaluation on the detected vulnerability, an impact of the vulnerability on a service may be evaluated. The preset evaluation items may further include a software safety evaluation item, that is, when the processor performs the trust evaluation on the detected vulnerability, it may be evaluated whether software to which the vulnerability belongs is software in a preset white list. The preset evaluation items may further include a software state evaluation item, that is, when the processor performs the trust evaluation on the detected vulnerability, it may be evaluated whether the software to which the vulnerability belongs is in a starting state.

Correspondingly, the purpose of the step S101 may be that the processor performs the trust evaluation of preset evaluation items on the detected vulnerability to compute the trust level of the vulnerability in combination with the impact of repairing the vulnerability on the service, so as to determine the impact of the vulnerability on the actual service of the user.

In an embodiment, a specific mode that the processor performs the trust evaluation of the preset evaluation item on the detected vulnerability and obtains the trust level corresponding to the vulnerability in the step S101 may be set through a designer. In an embodiment, when the preset evaluation items include the vulnerability hazard level evaluation item, the processor may evaluate the vulnerability hazard level of the vulnerability and obtain a hazard level score corresponding to the vulnerability. The higher the vulnerability hazard level is, the lower the corresponding hazard level score is, that is, when a vulnerability hazard level of a first vulnerability is higher than the vulnerability hazard level of a second vulnerability, a hazard level score corresponding to the first vulnerability is less than a hazard level score corresponding to the second vulnerability. In an embodiment, the processor may first determine the vulnerability hazard level of the vulnerability in the same or similar manner as the vulnerability hazard level detection method in the prior art, then the processor determine the hazard level score corresponding to the vulnerability according to the preset hazard level scores corresponding to the vulnerability hazard levels (as shown in Table 1).

TABLE 1

Corresponding table of vulnerability hazard level and hazard level score

| Vulnerability hazard level | Critical hazard | High hazard | Medium hazard | Low hazard |
|---|---|---|---|---|
| Hazard level score | 1 | 3 | 6 | 10 |

When the preset evaluation items include the service impact evaluation item, the processor may evaluate an impact of repairing the vulnerability on the system, and obtain a system impact score corresponding to the vulnerability; wherein the system impact score is a preset system restart score (in an embodiment, 1 point in Table 2), a preset system non-restart score (in an embodiment, 8 points in Table 2), a preset service restart score (in an embodiment, 6 point in Table 2) or a preset service non-restart score (in an embodiment, 10 point in Table 2), the preset system restart score is less than the preset system non-restart score, the preset service restart score is less than the preset service non-restart score, and the preset system restart score is less than the preset service restart score. In an embodiment, the processor may determine whether repairing a vulnerability causes a system restart and whether repairing a vulnerability causes a service restart separately, and then the processor determine a system impact score corresponding to the vulnerability according to preset system impact scores (as shown in Table 2) corresponding to determination results. As shown in Table 2, when repairing a vulnerability causes the system restart, the system impact score corresponding to the vulnerability may be 1. When repairing the vulnerability causes no system restart and no service restart, the system impact score corresponding to the vulnerability may be 10 points. When repairing the vulnerability causes a service restart and no system restart, the system impact score of the vulnerability may be 6 points.

TABLE 2

Corresponding table of vulnerability repairing impact and system impact score

| Vulnerability repairing impact on system | System restart | System non-restart | Service restart | Service non-restart |
|---|---|---|---|---|
| System impact score | 1 | 8 | 6 | 10 |

When the preset evaluation items include the software safety evaluation item, the processor may evaluate whether software corresponding to the vulnerability (that is, software to which the vulnerability belongs) is software in a white list, and obtain a software safety score corresponding to the vulnerability; where the software safety score is a preset white-list software score (for instance, 8 points in Table 3) or a preset non-white-list software score (for instance, 1 point in Table 3), and the preset white-list software score is greater than the preset non-white-list software score. In an embodiment, the processor may first determine whether the software to which the vulnerability belongs is software in the preset white list, and then the processor determine the system impact score corresponding to the vulnerability according to the preset software safety scores (as shown in Table 3) corresponding to determination results.

TABLE 3

Corresponding table of software to which vulnerability belongs and software safety score

| Whether software to which vulnerability belongs to white list | Yes | No |
|---|---|---|
| Software safety score | 8 | 1 |

When the preset evaluation items include the software state evaluation item, the processor may evaluate whether the software corresponding to the vulnerability is in a starting state, and obtain a software state score corresponding to the vulnerability; wherein the software state score is a preset software starting score (in an embodiment, 4 points in Table 4) or a preset software non-starting score (in an embodiment, 8 points in Table 4), and the preset software non-starting score is greater than the preset software starting score. In an embodiment, the processor may firstly determine whether the software to which the vulnerability belongs is in the starting state, and then the processor determine the software state score corresponding to the vulnerability according to the preset software state scores (as shown in Table 4) corresponding to the determination results.

TABLE 4

Corresponding table of state of software to which vulnerability belongs and software state score

| Whether software to which vulnerability belongs is in a starting state | Starting state | Non-starting state |
|---|---|---|
| Trust score | 4 | 8 |

Correspondingly, the processor may determine the trust level according to the obtained hazard level score, system impact score, software safety score and software state score corresponding to the vulnerability. In an embodiment, the processor may directly use an added result of the hazard level score, system impact score, software safety score and software state score corresponding to the vulnerability as the trust level corresponding to the vulnerability. The processor may further obtain the trust level corresponding to the vulnerability through computing a sum of a product of each preset evaluation item and a corresponding priority ratio according to the preset priority ratio corresponding to each preset evaluation item. That is, the processor may compute a sum of a first score, a second score, a third score and a fourth score to obtain the trust level; wherein the first score is a product of the hazard level score and a first priority ratio, the second score is a product of the system impact score and a second priority ratio, the third score is a product of the software safety score and a third priority ratio, the fourth score is a product of the software state score and a fourth priority ratio.

In an embodiment, the priority of the vulnerability hazard level evaluation item may be set to be greater than the priority of the service impact evaluation item, the priority of the service impact evaluation item is greater than the priority of the software safety evaluation item, the priority of the software safety evaluation item is greater than the priority of the software state evaluation item, that is, the first priority ratio is greater than the second priority ratio, the second priority ratio is greater than the third priority ratio, and the third priority ratio is greater than the fourth priority ratio. In an embodiment, the first priority ratio may be 40%, the second priority ratio may be 30%, the third priority ratio may be 20%, and the fourth priority ratio may be 10%, such that the sum of the first priority ratio, the second priority ratio, the third priority ratio and the fourth priority ratio is 1.

At step S102: the vulnerability is processed according to the trust level and a preset vulnerability trust list It can be understood that the higher the trust level of the vulnerability in the embodiment may indicate that the vulnerability is more easily trusted through the user, and the vulnerability does not need to be repaired. The preset vulnerability trust list in the step S102 may be a list for counting vulnerability information about trusted vulnerabilities (that is, vulnerabilities that do not need to be repaired after being detected) set through a designer or a user. The purpose of the step S102 may be that the processor uses the obtained trust level corresponding to the vulnerability and the preset vulnerability trust list to process the vulnerability, so as to further assist the user in quickly identifying a key vulnerability that needs to be repaired, thereby improving usability and efficiency, and reducing costs of manual analysis of vulnerabilities.

In an embodiment, a specific mode that the processor processes the vulnerability according to the trust level and the preset vulnerability trust list in the step S102 may be set through a designer according to a usage scene and a user requirement. In an embodiment, the processor may obtain a preset vulnerability trust list corresponding to the vulnerability; the processor determine whether the vulnerability is a user trust vulnerability according to the preset vulnerability trust list; when the vulnerability is not the user trust vulnerability according to the preset vulnerability trust list, the processor generate and send vulnerability prompting information corresponding to the vulnerability to a target device; wherein the vulnerability prompting information includes the trust level.

Correspondingly, the preset vulnerability trust list corresponding to the above vulnerability may be a preset vulnerability trust list required for determining whether the vulnerability is the user trust vulnerability. When multiple preset vulnerability trust lists are provided, the processor of the server may find the preset vulnerability trust list corresponding to the vulnerability according to a host ID, that is, an ID of a host where the vulnerability is located, in the vulnerability information about the vulnerability, that is, the preset vulnerability trust list corresponding to the vulnerability may be the preset vulnerability trust list corresponding to the host ID in the vulnerability information about the vulnerability. When one preset vulnerability trust list is provided, the preset vulnerability trust list may be the preset vulnerability trust list corresponding to the vulnerability. The above target device may be a device for receiving the vulnerability prompting information corresponding to the vulnerability at a user side. In an embodiment, the processor of the server may send the vulnerability prompting information corresponding to the vulnerability to the host corresponding to the host ID in the vulnerability information about the vulnerability, that is, the target device may be a host corresponding to the host ID in the vulnerability information about the vulnerability. A processor of a terminal may send the vulnerability prompting information corresponding to the vulnerability to a display device, that is, the target device may also be a display device.

Correspondingly, it is determined that whether the vulnerability is the user trust vulnerability according to the preset vulnerability trust list may be that the processor of the server determines whether the vulnerability is a vulnerability corresponding to the preset vulnerability trust list (that is, a user trust vulnerability) through determining whether a vulnerability ID in the vulnerability information about the vulnerability is stored in the preset vulnerability trust list corresponding to the host ID in the vulnerability information about the vulnerability. That is, the processor may use the host ID and the vulnerability ID in the vulnerability information about the vulnerability to match vulnerability data corresponding to the vulnerability ID in the preset vulnerability trust list corresponding to the host ID. When matching succeeds, it indicates that the vulnerability is trusted through the user, and corresponding vulnerability prompting information may no longer be pushed to the user side, that is, when the vulnerability is the user trust vulnerability, the flow may be ended directly. When matching fails, it is indicated that the vulnerability is not trusted through the user, and corresponding vulnerability prompting information may be pushed to the user side.

Correspondingly, before the preset vulnerability trust list corresponding to the vulnerability is obtained, the processor may further firstly determine whether the trust level corresponding to the vulnerability reaches a preset safety level. When the trust level corresponding to the vulnerability reaches the preset safety level, the process may be ended directly, that is, when the trust level of the vulnerability is very high, it can be defaulted that there is no need to repair the vulnerability, and there is no need to remind the user, so as to further reduce the workload of the user. When the trust level corresponding to the vulnerability does not reach the preset safety level, the step of obtaining the preset vulnerability trust list corresponding to the vulnerability may be performed.

In an embodiment, the processor of the server may manage vulnerabilities in a host dimension in a mode shown in Table 5.

TABLE 5

| Display of host dimension vulnerability management page | | | | |
|---|---|---|---|---|
| Host ID | Host IP | Host name | Vulnerability number | Trust number |

The processor of the server may add the vulnerability to the preset vulnerability trust list corresponding to the host through means of the user setting trust add and through using a showing manner of a detailed list of host vulnerabilities as shown in Table 6.

TABLE 6

| Detailed list of host vulnerability | | | |
|---|---|---|---|
| Vulnerability ID | Vulnerability name | Trust level | Trust add |

The processor of the server may remove the vulnerability from the preset vulnerability trust list corresponding to the host through means of the user setting trust removal and through using a showing manner of a host vulnerability trust list as shown in Table 7.

TABLE 7

| Host vulnerability trust list | | | | |
|---|---|---|---|---|
| Vulnerability ID | Vulnerability name | Trust level | Trust state | Trust removal |

It is to be noted that after the processor sends vulnerability prompting information corresponding to the vulnerability to a target device, the embodiment may further include that the processor obtains resolve information corresponding to the vulnerability prompting information; and takes, when the resolve information is trust information, the vulnerability as the user trust vulnerability, and adds trust list information corresponding to the vulnerability to the preset vulnerability trust list; wherein the trust list information includes a vulnerability identity (ID), a vulnerability name and a trust level of the vulnerability; or repairs, when the resolve information is repair information, the vulnerability. In an embodiment, after the vulnerability prompting information is sent corresponding to the vulnerability to the host corresponding to the host ID in the vulnerability information about the vulnerability, the processor of the server may receive the resolve information corresponding to the vulnerability prompting information returned through the host, when the resolve information is information corresponding to that the user trusts the vulnerability (that is, trust information, such as trust add in Table 6), the processor may add trust list information (in an embodiment, the vulnerability ID and the vulnerability name in Table 6) corresponding to the vulnerability to the preset vulnerability trust list. When the resolve information is information corresponding to repairing the vulnerability (that is, repair information), the processor may repair the vulnerability in the same or similar mode as a vulnerability repair method in the prior art whenwhen.

In an embodiment, the embodiment is shown through taking the processing of one detected vulnerability through a processor of a server or a terminal as an instance. The processing of other detected vulnerabilities through the processor may be implemented in the same or similar mode as the method provided in the embodiment, which is not limited in the embodiment. Correspondingly, in the embodiment, before step S101, the processor may detect a vulnerability that needs to be processed in the same or similar mode as the vulnerability detection method in the prior art, which is further not limited in the embodiment.

It can be understood that the embodiment may further include that, when detecting that the trust level of the vulnerability (that is, a user trust vulnerability) corresponding to the preset vulnerability trust list changes (for instance, a level is reduced), the processor generates and sends trust change information to the user to prompt the user to adjust the preset vulnerability trust list according to needs. That is, the processor may detect a target trust level corresponding to a target vulnerability according to the preset vulnerability trust list; and the processor generate trust change information corresponding to the target vulnerability. The target vulnerability may be any one of user trust vulnerabilities corresponding to the preset vulnerability trust list, the target trust level may be a changed (such as reduced) trust level corresponding to the target vulnerability, and the trust change information may include the target trust level.

Correspondingly, the processor may detect the target trust level corresponding to the target vulnerability according to a preset time interval, that is, the processor reevaluates the trust level of each user trust vulnerability according to the preset time interval, to determine whether the trust level of any user trust vulnerability changes. The processor may also detect the target trust level corresponding to the target vulnerability when detecting that host software information (for instance, a white list or a starting state) changes. That is, after it is determined that the trust level of the user trust vulnerability changes, the trust level of the user trust vulnerability corresponding to all or changed host software information is revaluated. The embodiment does not limit it.

In the embodiment, the embodiment of the present disclosure performs a trust evaluation of preset evaluation items on the detected vulnerability and obtains the trust level corresponding to the vulnerability and sets a preset vulnerability trust list, vulnerabilities that do not need to be repaired in detected vulnerabilities may be preliminarily screened, and in combination with an impact of the vulnerabilities on an actual service of a user, the user is assisted in quickly identifying a key vulnerability that needs to be repaired, thereby improving usability and efficiency, and reducing costs of manual analysis of vulnerabilities.

Figure 2:
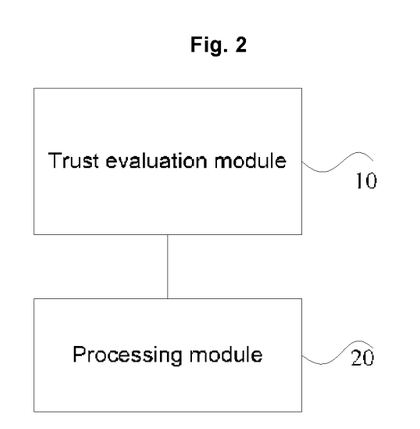
FIG. 2 is a structural diagram of a vulnerability processing apparatus provided in an embodiment of the present disclosure.

With reference to FIG. 2, FIG. 2 is a structural diagram of a vulnerability processing apparatus provided in an embodiment of the present disclosure. The apparatus may include:
 a trust evaluation module 10 is configured to perform a trust evaluation of preset evaluation items on a detected vulnerability, and obtain a trust level corresponding to the vulnerability, where the preset evaluation items include a vulnerability hazard level evaluation item and a service impact evaluation item; and
 a processing module 20 is configured to process the vulnerability according to the trust level and a preset vulnerability trust list.

In some embodiments, the processing module 20 may include:
 a list obtaining sub-module is configured to obtain the preset vulnerability trust list corresponding to the vulnerability;
 a vulnerability determination sub-module is configured to determine whether the vulnerability is a user trust vulnerability according to the preset vulnerability trust list; and a sending sub-module is configured to generate and send, when the vulnerability is not the user trust vulnerability, vulnerability prompting information corresponding to the vulnerability to a target device; wherein the vulnerability prompting information includes the trust level.

In some embodiments, the processing module 20 may further include:
a level determination sub-module is configured to determine whether the trust level reaches a preset safety level; and send, when the trust level does not reach the preset safety level, a start signal to the obtaining sub-module.

In some embodiments, the processing module 20 may further include:
a solution obtaining sub-module is configured to obtain resolve information corresponding to the vulnerability prompting information;
a trust adding sub-module is configured to take, when the resolve information is trust information, the vulnerability as the user trust vulnerability, and add trust list information corresponding to the vulnerability to the preset vulnerability trust list; where the trust list information includes a vulnerability identity (ID), a vulnerability name and a trust level of the vulnerability; and
a repairing sub-module is configured to repair the vulnerability, when the resolve information is repair information.

In some embodiments, the apparatus may include:
a change detection module is configured to detect a target trust level corresponding to a target vulnerability according to the preset vulnerability trust list; wherein the target vulnerability is any one of user trust vulnerabilities corresponding to the preset vulnerability trust list, and the target trust level is a reduced trust level corresponding to the target vulnerability; and
a change generation module is configured to generate trust change information corresponding to the target vulnerability; wherein the trust change information includes the target trust level.

In some embodiments, the trust evaluation module 10 may include:
a hazard evaluation sub-module is configured to evaluate a vulnerability hazard level of the vulnerability, and obtain a hazard level score corresponding to the vulnerability; wherein a higher level of the vulnerability hazard level corresponds to a lower score of the hazard level score;
a repair impact evaluation sub-module is configured to evaluate an impact of repairing the vulnerability on the system, and obtain a system impact score corresponding to the vulnerability; wherein the system impact score is a preset system restart score, a preset system non-restart score, a preset service restart score or a preset service non-restart score, the preset system restart score is less than the preset system non-restart score, the preset service restart score is less than the preset service non-restart score, and the preset system restart score is less than the preset service restart score;
a software safety evaluation sub-module is configured to evaluate whether software corresponding to the vulnerability is software in a white list, and obtain a software safety score corresponding to the vulnerability; wherein the software safety score is a preset white-list software score or a preset non-white-list software score, and the preset white-list software score is greater than the preset non-white-list software score;

a software state evaluation sub-module is configured to evaluate whether the software corresponding to the vulnerability is in a starting state, and obtain a software state score corresponding to the vulnerability; wherein the software state score is a preset software starting score or a preset software non-starting score, and the preset software non-starting score is greater than the preset software starting score; and
a trust determination sub-module is configured to determine the trust level according to the hazard level score, the system impact score, the software safety score, and the software state score.

In some embodiments, the trust determination sub-module may be configured to compute a sum of a first score, a second score, a third score and a fourth score to obtain the trust level; wherein the first score is a product of the hazard level score and a first priority ratio, the second score is a product of the system impact score and a second priority ratio, the third score is a product of the software safety score and a third priority ratio, the fourth score is a product of the software state score and a fourth priority ratio, the first priority ratio is greater than the second priority ratio, the second priority ratio is greater than the third priority ratio, and the third priority ratio is greater than the fourth priority ratio.

In the embodiment, the embodiment of the present disclosure performs the trust evaluation of preset evaluation items on the detected vulnerability and obtains the trust level corresponding to the vulnerability through means of the trust evaluation module 10 and sets the preset vulnerability trust list, vulnerabilities that do not need to be repaired in detected vulnerabilities may be preliminarily screened, and in combination with an impact of the vulnerabilities on an actual service of a user, the user is assisted in quickly identifying a key vulnerability that needs to be repaired, thereby improving usability and efficiency, and reducing costs of manual analysis of vulnerabilities.

Figure 3:
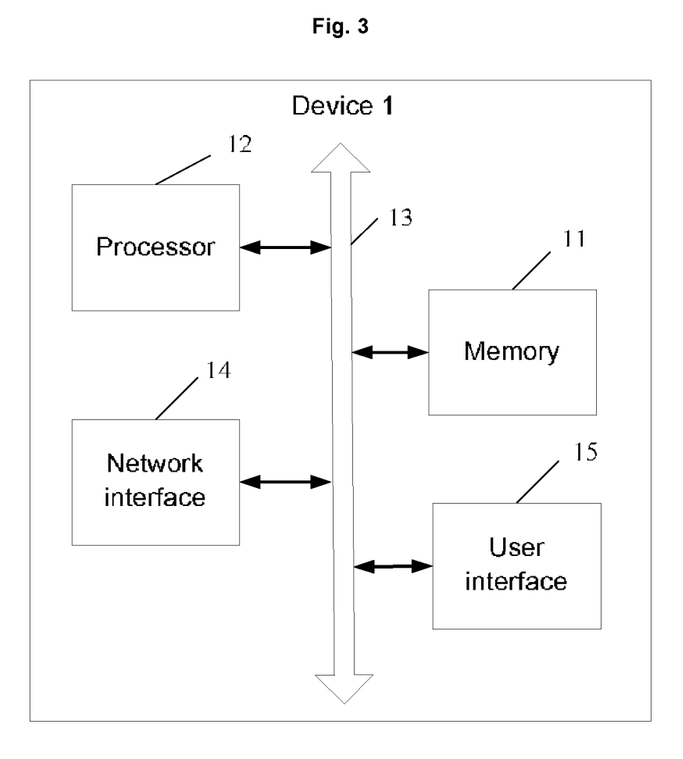
FIG. 3 is a schematic structural diagram of a vulnerability processing device provided in an embodiment of the present disclosure.

With reference to FIG. 3, FIG. 3 is a schematic structural diagram of a vulnerability processing device provided in an embodiment of the present disclosure. The device 1 may include:
a memory 11 is configured to store a computer program; and a processor 12 is configured to implement the steps of the vulnerability processing method provided in the embodiment when executing the computer program.

The device 1 (for instance, a preboot execution environment (PXE) server) may includes a memory 11, a processor 12 and a bus 13.

The memory 11 includes at least one type of readable storage medium, the readable storage medium includes a flash memory, a hard disk, a multimedia card, a card-type memory (for instance, secure digital (SD) or Data (DX) memory, etc.), a magnetic memory, a magnetic disk, an optical disk, etc. The memory 11 may be an internal storage unit of the device 1 in some embodiments, for instance, a hard disk of a server. The memory 11 may further be an external storage device of the device 1 in some other embodiments, a plug-in hard disk provided on a server, a smart media card (SMC), a secure digital (SD) card, a flash card, etc. Further, the memory 11 may include both an internal storage unit and an external storage device of the device 1. The memory 11 may be used not only for storing application software and various types of data installed on the device 1, for instance: a code or the like of a program executing the vulnerability processing method, and may also be used for temporarily storing data that has been output or is to be output.

In some embodiments, the processor 12 may be a central processing unit (CPU), a controller, a microcontroller, a microprocessor or another data processing chip for running a program code or processing data stored in the memory 11, for instance, a code of a program executing the vulnerability processing method, etc.

The bus 13 may be a peripheral component interconnect (PCI) bus or an extended industry standard architecture (EISA) bus, etc. The bus may be divided into an address bus, a data bus, a control bus, etc. For ease of illustration, only one bold line is shown in FIG. 3, but it does not indicate that there is only one bus or type of bus.

Further, the device may further include a network interface 14, the network interface 14 may include a wired interface and/or a wireless interface (for instance, a WI-FI interface, a Bluetooth interface, etc.), typically for establishing communication connection between the device 1 and other electronic devices.

In some embodiments, the device 1 may further include a user interface 15, the user interface 15 may include a display, and an input unit such as a keyboard, and an optional user interface 15 may further include a standard wired interface, a wireless interface. In some embodiments, the display may be a light-emitting diode (LED) display, a liquid crystal display, a touch-sensitive liquid crystal display, an organic light-emitting diode (OLED) touchpad, etc. The display may further suitably be called a display screen or a display unit for displaying information processed in the device 1 and for displaying a visualized user interface.

FIG. 3 only shows a device 1 with components 11-15, it can be understood through those skilled in the art that the structure shown in FIG. 3 does not constitute a limitation of the device 1, and may include fewer or more components than what is shown, or combine some components, or different arrangement of components.

Moreover, further disclosed in an embodiment of the present disclosure is a computer-readable storage medium, storing a computer program, wherein the computer program implements steps of the vulnerability processing method provided in the above embodiments when executed by a processor.

The storage medium described above may include: a universal serial bus flash disk, a read-only memory (ROM), a random access memory (RAM), a magnetic disk, an optical disk, or various media that may store a program code.

The various embodiments in the specification are described in a progressive manner, and each embodiment is focused on the differences from other embodiments, and the same and similar parts of the various embodiments are referred to each other. Since the apparatus, device and computer-readable storage medium disclosed in the embodiments correspond to the method disclosed in the embodiments, the description is simple, and reference can be made to the method description.

The vulnerability processing method, apparatus and device, and a computer-readable storage medium provided in the present disclosure are described in detail above. A principle and an embodiment of the present disclosure are described through applying specific embodiments, and the description of the above embodiments is only configured to help to understand the method and the core idea of the present disclosure. Several improvements and modifications are made through those of ordinary skill in the art without departing from the principles of the present disclosure, which should also be considered to fall within the scope of protection of the present disclosure.

What is claimed is:

1. A vulnerability processing method, comprising: performing, by a processor, a trust evaluation of preset evaluation items on a detected vulnerability, and obtaining a trust level corresponding to the vulnerability, wherein the preset evaluation items comprise a vulnerability hazard level evaluation item and a service impact evaluation item; and processing, by the processor, the vulnerability according to the trust level and a preset vulnerability trust list;

wherein performing, by the processor, the trust evaluation of preset evaluation items on the detected vulnerability, and obtaining the trust level corresponding to the vulnerability comprises: evaluating, by the processor, a vulnerability hazard level of the vulnerability, and obtaining a hazard level score corresponding to the vulnerability; wherein a higher level of the vulnerability hazard level corresponds to a lower score of the hazard level score; evaluating, by the processor, an impact of repairing the vulnerability on the system, and obtaining, by the processor, a system impact score corresponding to the vulnerability; wherein the system impact score is a preset system restart score, a preset system non-restart score, a preset service restart score or a preset service non-restart score, the preset system restart score is less than the preset system non-restart score, the preset service restart score is less than the preset service non-restart score, and the preset system restart score is less than the preset service restart score; evaluating, by the processor, whether software corresponding to the vulnerability is software in a white list, and obtaining a software safety score corresponding to the vulnerability; wherein the software safety score is a preset white-list software score or a preset non-white-list software score, and the preset white-list software score is greater than the preset non-white-list software score; evaluating, by the processor, whether the software corresponding to the vulnerability is in a starting state, and obtaining a software state score corresponding to the vulnerability; wherein the software state score is a preset software starting score or a preset software non-starting score, and the preset software non-starting score is greater than the preset software starting score; determining, by the processor, the trust level according to the hazard level score, the system impact score, the software safety score, and the software state score; determining, by the processor, whether the vulnerability is a user trust vulnerability; when the vulnerability is not the user trust vulnerability, sending, by the processor, vulnerability prompting information corresponding to the vulnerability to a host identified by a host ID in the vulnerability information; obtaining, by the processor, resolve information corresponding to the vulnerability prompting information; and when the resolve information is trust information, taking, by the processor, the vulnerability as the user trust vulnerability, and adding, by the processor, trust list information corresponding to the vulnerability to the preset vulnerability trust list; and when the resolve information is repair information, repairing, by the processor, the vulnerability.

2. The vulnerability processing method as claimed in claim 1, wherein processing the vulnerability according to the trust level and the preset vulnerability trust list comprises:

obtaining, by the processor, the preset vulnerability trust list corresponding to the vulnerability;

determining, by the processor, whether the vulnerability is a user trust vulnerability according to the preset vulnerability trust list; and when the vulnerability is not the user trust vulnerability, generating and sending, by the processor, vulnerability prompting information corresponding to the vulnerability to a target device; wherein the vulnerability prompting information comprises the trust level.

3. The vulnerability processing method as claimed in claim 2, wherein before the preset vulnerability trust list corresponding to the vulnerability is obtained, the method further comprises:

determining, by the processor, whether the trust level reaches a preset safety level; and when the trust level does not reach the preset safety level, executing, by the processor, the step of obtaining the preset vulnerability trust list corresponding to the vulnerability.

4. The vulnerability processing method as claimed in claim 2, wherein the trust list information comprises a vulnerability identity (ID), a vulnerability name and a trust level of the vulnerability.

5. The vulnerability processing method as claimed in claim 1, further comprising:

detecting, by the processor, a target trust level corresponding to a target vulnerability according to the preset vulnerability trust list; wherein the target vulnerability is any one of user trust vulnerabilities corresponding to the preset vulnerability trust list, and the target trust level is a reduced trust level corresponding to the target vulnerability; and generating by the processor, trust change information corresponding to the target vulnerability; wherein the trust change information comprises the target trust level.

6. The vulnerability processing method as claimed in claim 1, wherein the determining, by the processor, the trust level according to the hazard level score, the system impact score, the software safety score, and the software state score comprises: computing, by the processor, a sum of a first score, a second score, a third score and a fourth score to obtain the trust level; wherein the first score is a product of the hazard level score and a first priority ratio, the second score is a product of the system impact score and a second priority ratio, the third score is a product of the software safety score and a third priority ratio, the fourth score is a product of the software state score and a fourth priority ratio, the first priority ratio is greater than the second priority ratio, the second priority ratio is greater than the third priority ratio, and the third priority ratio is greater than the fourth priority ratio.

7. The vulnerability processing method as claimed in claim 2, wherein obtaining the preset vulnerability trust list corresponding to the vulnerability comprises:

when multiple preset vulnerability trust lists are provided, obtaining, by the processor, a host ID corresponding to the vulnerability; and obtaining, by the processor, the preset vulnerability trust list corresponding to the vulnerability through the host ID corresponding to the vulnerability.

8. The vulnerability processing method as claimed in claim 2, wherein determining whether the vulnerability is the user trust vulnerability according to the preset vulnerability trust list comprises:

obtaining, by the processor, the vulnerability ID corresponding to the vulnerability; and determining, by the processor, whether the vulnerability is the user trust vulnerability through determining whether the vulnerability ID is stored in the preset vulnerability trust list corresponding to the vulnerability.

9. The vulnerability processing method as claimed in claim 2, further comprising:

when the vulnerability is the user trust vulnerability, ending, by the processor, the processing steps for the vulnerability.

10. The vulnerability processing method as claimed in claim 3, further comprising:

when the trust level reached the preset safety level, ending the processing, by the processor, steps for the vulnerability.

11. The vulnerability processing method as claimed in claim 5, wherein before the target trust level corresponding to the target vulnerability according to the preset vulnerability trust list is detected, the method further comprises:

revaluating the trust level of each user trust vulnerability according to the preset time interval, to determine whether the trust level of any user trust vulnerability changes.

12. The vulnerability processing method as claimed in claim 1, wherein evaluating the vulnerability hazard level of the vulnerability, and obtaining a hazard level score corresponding to the vulnerability comprises: determining, by the processor, the vulnerability hazard level of the vulnerability; and determining, by the processor, the hazard level score corresponding to the vulnerability according to the preset hazard level scores corresponding to vulnerability hazard levels.

13. The vulnerability processing method as claimed in claim 1, wherein evaluating an impact of repairing the vulnerability on the system, and obtaining a system impact score corresponding to the vulnerability comprises: obtaining, by the processor, a determination result through determining whether repairing the vulnerability causes the preset system restart, and determining, by the processor, whether repairing the vulnerability causes the preset system restart; and determining the system impact score corresponding to the vulnerability according to preset system impact scores corresponding to determination results.

14. The vulnerability processing method as claimed in claim 1, wherein evaluating whether software corresponding to the vulnerability is software in the white list, and obtaining the software safety score corresponding to the vulnerability comprises: obtaining, by the processor, a determination result through determining software corresponding to the vulnerability is software in the white list; and determining, by the processor, the system impact score corresponding to the vulnerability according to preset software safety scores corresponding to determination results.

15. The vulnerability processing method as claimed in claim 1, wherein evaluating whether the software corresponding to the vulnerability is in the starting state, and obtaining the software state score corresponding to the vulnerability comprises: obtaining, by the processor, a determination result through determining whether the software corresponding to the vulnerability is in the starting state; and determining, by the processor, the software state score corresponding to the vulnerability according to the preset software state scores corresponding to determination results.

16. The vulnerability processing method as claimed in claim 1, wherein determining the trust level according to the hazard level score, the system impact score, the software safety score, and the software state score comprises: computing, by the processor, a sum of the trust level according to the hazard level score, the system impact score, the software safety score, and the software state score to obtain the trust level.

17. A vulnerability processing device, comprising: a memory configured to store a computer program; and a processor configured to implement the computer program to: perform a trust evaluation of preset evaluation items on a detected vulnerability, and obtain a trust level corresponding to the vulnerability, wherein the preset evaluation items comprise a vulnerability hazard level evaluation item and a service impact evaluation item; and process the vulnerability according to the trust level and a preset vulnerability trust; evaluate a vulnerability hazard level of the vulnerability, and obtaining a hazard level score corresponding to the vulnerability; wherein a higher level of the vulnerability hazard level corresponds to a lower score of the hazard level score; evaluate an impact of repairing the vulnerability on the system, and obtaining, by the processor, a system impact score corresponding to the vulnerability; wherein the system impact score is a preset system restart score, a preset system non-restart score, a preset service restart score or a preset service non-restart score, the preset system restart score is less than the preset system non-restart score, the preset service restart score is less than the preset service non-restart score, and the preset system restart score is less than the preset service restart score; evaluate whether software corresponding to the vulnerability is software in a white list, and obtaining a software safety score corresponding to the vulnerability; wherein the software safety score is a preset white-list software score or a preset non-white-list software score, and the preset white-list software score is greater than the preset non-white-list software score; evaluate whether the software corresponding to the vulnerability is in a starting state, and obtaining a software state score corresponding to the vulnerability; wherein the software state score is a preset software starting score or a preset software non-starting score, and the preset software non-starting score is greater than the preset software starting score; a-n determine the trust level according to the hazard level score, the system impact score, the software safety score, and the software state score; determine, by the processor, whether the vulnerability is a user trust vulnerability; when the vulnerability is not the user trust vulnerability, send, by the processor, vulnerability prompting information corresponding to the vulnerability to a host identified by a host ID in the vulnerability information; obtain, by the processor, resolve information corresponding to the vulnerability prompting information; and when the resolve information is trust information, take, by the processor, the vulnerability as the user trust vulnerability, and add, by the processor, trust list information corresponding to the vulnerability to the preset vulnerability trust list; and when the resolve information is repair information, repair, by the processor, the vulnerability.

18. The vulnerability processing device as claimed in claim 17, the processor is further configured to execute the computer program to:
obtain the preset vulnerability trust list corresponding to the vulnerability;
determine whether the vulnerability is a user trust vulnerability according to the preset vulnerability trust list; and
when the vulnerability is not the user trust vulnerability, generate and send vulnerability prompting information corresponding to the vulnerability to a target device; wherein the vulnerability prompting information comprises the trust level.

19. A non-transitory computer-readable storage medium, storing a computer program, wherein the computer program, when executed by a processor, cause the processor to: perform a trust evaluation of preset evaluation items on a detected vulnerability, and obtain a trust level corresponding to the vulnerability, wherein the preset evaluation items comprise a vulnerability hazard level evaluation item and a service impact evaluation item; and process the vulnerability according to the trust level and a preset vulnerability trust list; evaluate a vulnerability hazard level of the vulnerability, and obtaining a hazard level score corresponding to the vulnerability; wherein a higher level of the vulnerability hazard level corresponds to a lower score of the hazard level score; evaluate an impact of repairing the vulnerability on the system, and obtaining, by the processor, a system impact score corresponding to the vulnerability; wherein the system impact score is a preset system restart score, a preset system non-restart score, a preset service restart score or a preset service non-restart score, the preset system restart score is less than the preset system non-restart score, the preset service restart score is less than the preset service non-restart score, and the preset system restart score is less than the preset service restart score; evaluate whether software corresponding to the vulnerability is software in a white list, and obtaining a software safety score corresponding to the vulnerability; wherein the software safety score is a preset white-list software score or a preset non-white-list software score, and the preset white-list software score is greater than the preset non-white-list software score; evaluate whether the software corresponding to the vulnerability is in a starting state, and obtaining a software state score corresponding to the vulnerability; wherein the software state score is a preset software starting score or a preset software non-starting score, and the preset software non-starting score is greater than the preset software starting score; a-d determine the trust level according to the hazard level score, the system impact score, the software safety score, and the software state score; determine, by the processor, whether the vulnerability is a user trust vulnerability; when the vulnerability is not the user trust vulnerability, send, by the processor, vulnerability prompting information corresponding to the vulnerability to a host identified by a host ID in the vulnerability information; obtain, by the processor, resolve information corresponding to the vulnerability prompting information; and when the resolve information is trust information, take, by the processor, the vulnerability as the user trust vulnerability, and add, by the processor, trust list information corresponding to the vulnerability to the preset vulnerability trust list; and when the resolve information is repair information, repair, by the processor, the vulnerability.

* * * * *